United States Patent [19]
Corghi

[11] Patent Number: 5,472,034
[45] Date of Patent: Dec. 5, 1995

[54] BEAD GUIDE IMPLEMENT FOR FACILITATING THE MOUNTING OF TIRES ONTO RESPECTIVE WHEEL RIMS

[75] Inventor: Remo Corghi, Correggio Emilia, Italy

[73] Assignee: Corghi S.p.A., Reggio Emilia, Italy

[21] Appl. No.: 214,249

[22] Filed: Mar. 17, 1994

[30] Foreign Application Priority Data

Mar. 18, 1993 [IT] Italy .................................. RE93U0020

[51] Int. Cl.$^6$ ............................................. B60C 25/435
[52] U.S. Cl. ............................................ 157/1.24; 157/1.3
[58] Field of Search .................................. 157/1.22, 1.24, 157/1.3

[56] References Cited

U.S. PATENT DOCUMENTS 3,029,861 4/1962 Gambardella .......................... 157/1.22

Primary Examiner—James G. Smith
Attorney, Agent, or Firm—Birch, Stewart, Kolasch & Birch

[57] ABSTRACT

An implement for facilitating the mounting of tires onto respective wheel rims, typically for tire removal machines including a horizontal self-centering unit (4) and a projecting horizontal arm (6), on the end of which there slides a height-adjustable vertical rod (8) which is provided lowerly with a tool (9) for mounting and removing tires (10). The tire mounting machine includes a shaped arm which at one end is provided with a projecting profiled head (18), and at its other end is mounted rotatable and slidable on said vertical rod (8) so as to occupy a raised rest position and a lowered working position in which said head can be inserted between the edge of a wheel rim (44) locked by the self-centering unit and the bead (110) of the tire (10) to be mounted, the head resting against that wheel rim part (42) forming the seat for receiving the bead.

5 Claims, 4 Drawing Sheets

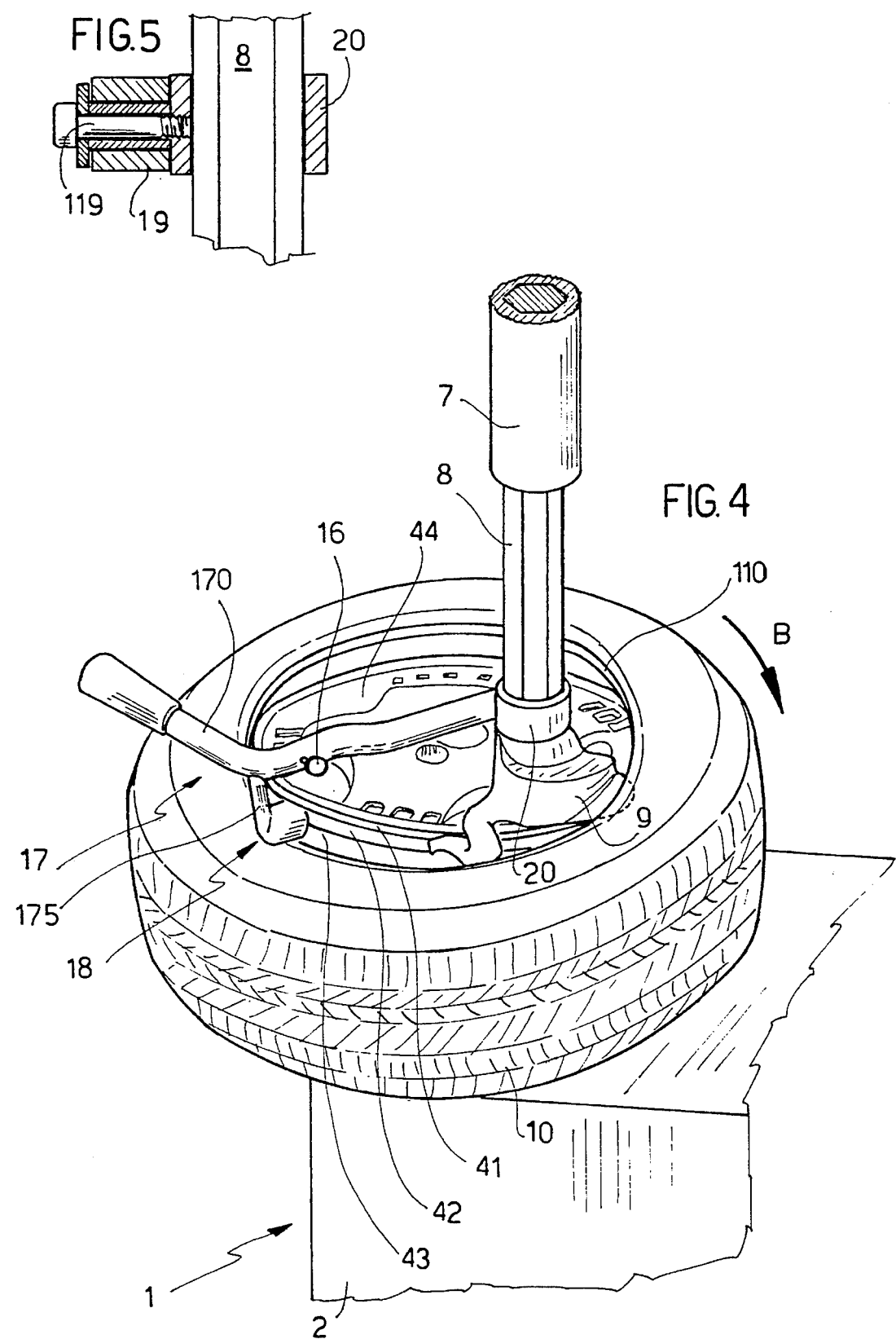

BEAD GUIDE IMPLEMENT FOR FACILITATING THE MOUNTING OF TIRES ONTO RESPECTIVE WHEEL RIMS

BACKGROUND OF THE INVENTION

1. Field of the Invention

This invention relates to an implement for facilitating the mounting of tires on respective wheel rims, such as to prevent damage to the tire and under conditions of maximum safety for the operator.

2. Description of the Background Art

As is well known, modern tires, removal machines, typically for automobile and other light vehicle wheels and for motorcycle wheels, comprise, inter alia, a horizontal self-centering unit provided for locking the rims of said wheels, and an overlying tool for mounting and removing the respective tires, thus acting between the edge of the wheel rim and the tire bead.

Said tool can be adjusted both vertically and horizontally, in order to adapt its operating position to wheel rims of different widths and diameters.

Specifically, said tool is supported by a vertical rod slidingly mounted at the end of an arm branching from a column situated behind the self-centering unit.

With reference to said column, four different types of tire removal machine are known, namely:

- a first type in which the column is fixed to the base of the tire removal machine,
- a second type in which the column can swing in a vertical plane passing through the axis of rotation of the self-centering unit,
- a third type in which the column can rotate about its own longitudinal axis, and
- a fourth type in which the rod support arm is hinged to the column so that it can swing in a horizontal plane.

A problem common to all these tire removal machines is that of easily, rapidly and reliably mounting a tire on the respective wheel rim.

The procedure for positioning each individual bead of a tire below the edge of a wheel rim locked onto the self-centering unit, at that moment stationary, is as follows:

- firstly, the bead is rested on the edge of the wheel rim,
- secondly, the mounting tool is inserted between the rim and the bead,
- thirdly, the bead is inclined in order to position below said tool and below said wheel rim edge that bead part which, with reference to the direction of rotation (for mounting the tire) of the self-centering unit, lies downstream of said tool, and
- finally, the self-centering unit is made to rotate, with the result that the tool inserts the remaining (upstream) part of the bead below the wheel rim edge.

However as the mounting tool acts alone, it can subject the bead to difficulties and/or excessive stresses, and hence to possible damage (such as stretching, local weaknesses and cracking), resulting in damage to the tire.

This is due to the fact that that bead part already inserted rests in its final seat without entering the central channel of the wheel rim, which is obviously of smaller diameter.

For this reason, when mounting each individual bead the operator is required to thrust downwards that bead part gradually arriving below the edge of the wheel rim, in order to maintain it within the rim channel.

Said thrust action is normally exerted by hand, in certain cases a lever being used, in particular if the beads are fairly rigid and hence particularly difficult to retain within the wheel rim channel.

However this procedure has unfortunately proved relatively dangerous because the operator is compelled to operate (by hand or via said lever) on parts under movement, and because the said operator often operates on greased surfaces (aimed at facilitating bead insertion).

Moreover, said operations are relatively uncomfortable, relatively burdonsome and relatively lengthy, especially if particularly rigid beads are concerned.

From the aforegoing it is apparent that in this sector there is a requirement for means for obviating the aforelisted problems.

To satisfy said requirements, special devices are known for application to specific types of tire removal machines, their use being therefore very limited.

One of said known devices is illustrated in Utility Model Application No. 34843 B/89 in the name of the present applicant, which reference should be made for further details.

SUMMARY OF THE PRESENT INVENTION

The object of the present invention is to provide a device of universal application, able to be used in any type of tire removal machine.

Said object is attained by an implement comprising a shaped arm which at one end is provided with a projecting profiled head intended to maintain the tire bead pressed into the central channel of the wheel rim, and at its other end is mounted rotatable and slidable on the vertical tool support rod of the tire removal machine, so as to occupy a raised rest position in which it lies spaced from the edge of the wheel rim, and a lowered working position, in said lowered position it being able to swivel in a horizontal plane.

When in its working position said head lies between the edge of the wheel rim when locked onto the self-centering unit and the bead of the tire to be mounted, said head resting in the seat which is to receive the bead.

In addition the implement of the invention is shaped and dimensioned such as to remain independently coupled to the wheel rim edge when the self-centering unit is rotated to insert the bead.

All the objects of the invention are attained by the aforesaid means.

In this respect, once the head has been placed in its correct operating position, no manual intervention is required by the operator.

By this means a bead can be inserted in a particularly rapid and comfortable manner under conditions of maximum safety for the operator.

The head is shaped to smoothly guide the bead towards the wheel rim channel, without subjecting said bead to inconvenient stressing and without damaging in any way the surfaces of the seat which is to receive the tire bead.

BRIEF DESCRIPTION OF THE DRAWINGS

The characteristics and constructional merits of the invention will be apparent from the detailed description given hereinafter with reference to the accompanying figures, in which:

FIG. 4 is a partial perspective view showing the invention in its working position;

FIGS. 5 and 6 are enlarged on the lines V—V and VI—VI respectively of FIG. 3, to an enlarged scale;

DETAILED DESCRIPTION OF THE PREFERRED EMBODIMENT(S)

Figures 1, 1A:
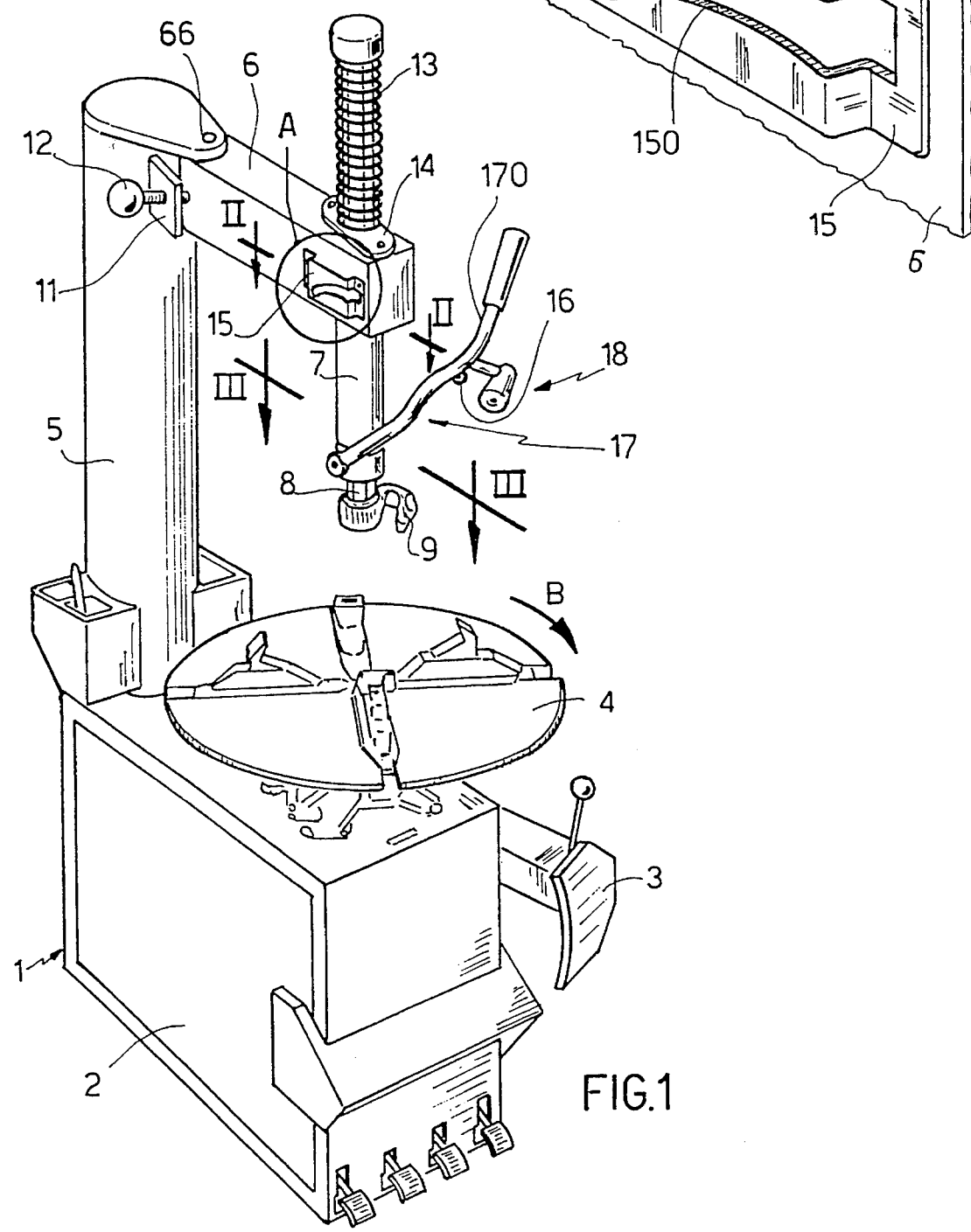
FIG. 1 is a perspective view of a tire removal machine fitted with the invention, this latter being shown in its raised position.
FIG. 1A is an enlarged scale view of the circle A of FIG 1.

Said figures, and in particular FIG. 1, show a tire removal machine 1 of known tire, comprising basically a base frame 2, a bead removal tool 3, a self-centering unit 4, a fixed rear column 5, an arm 6 hinged frontally to the top of the column 5 on a vertical axis 66, a descending vertical tube 7 fixed to the free end of said arm 6, a prismatic rod 8 slidingly mounted within said tube 7 but torsionally locked thereto, and a usual tool 9 for mounting/removing automobile or other light vehicle wheels and motorcycle wheels. The tool 9 is fixed to the lower end of said rod 8, with the rear end of the arm 6 there being associated a plate 11 having a push screw 12 with a knob for adjusting the range of swing of the arm 6.

Between said rod 8 and said arm 6 there are interposed a compressed spring 13 for raising the rod 8, and a device 14 of constriction tire for locking the rod 8 at the required height.

Figure 2:
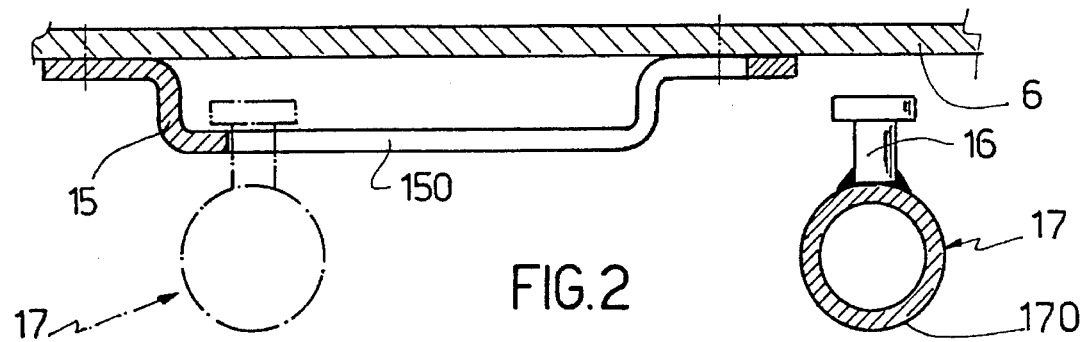
FIG. 2 is an enlarged section view on the line II—II of FIG. 1.

From FIGS. 1, 1A and 2 it will be noted that to the side of the free end of said arm 6 there is fixed a member 15 for supporting the tool 17 of the invention when in its raised rest position.

Said member 15 consists of a bridge-shaped plate provided with a longitudinally profiled slot 150.

With reference to FIG. 1A, said slot comprises:

an initial part of greatest width mostly contained in that side of the bridge-shaped plate facing the front of the tire removal machine, an arched central part with its concavity facing downwards and with its width reducing gradually in the direction away from said initial part, and a depressed end part in the form of a recess for retaining the implement 17 and able to prevent its untimely disengagement if it is inadvertently struck.

Figure 3:
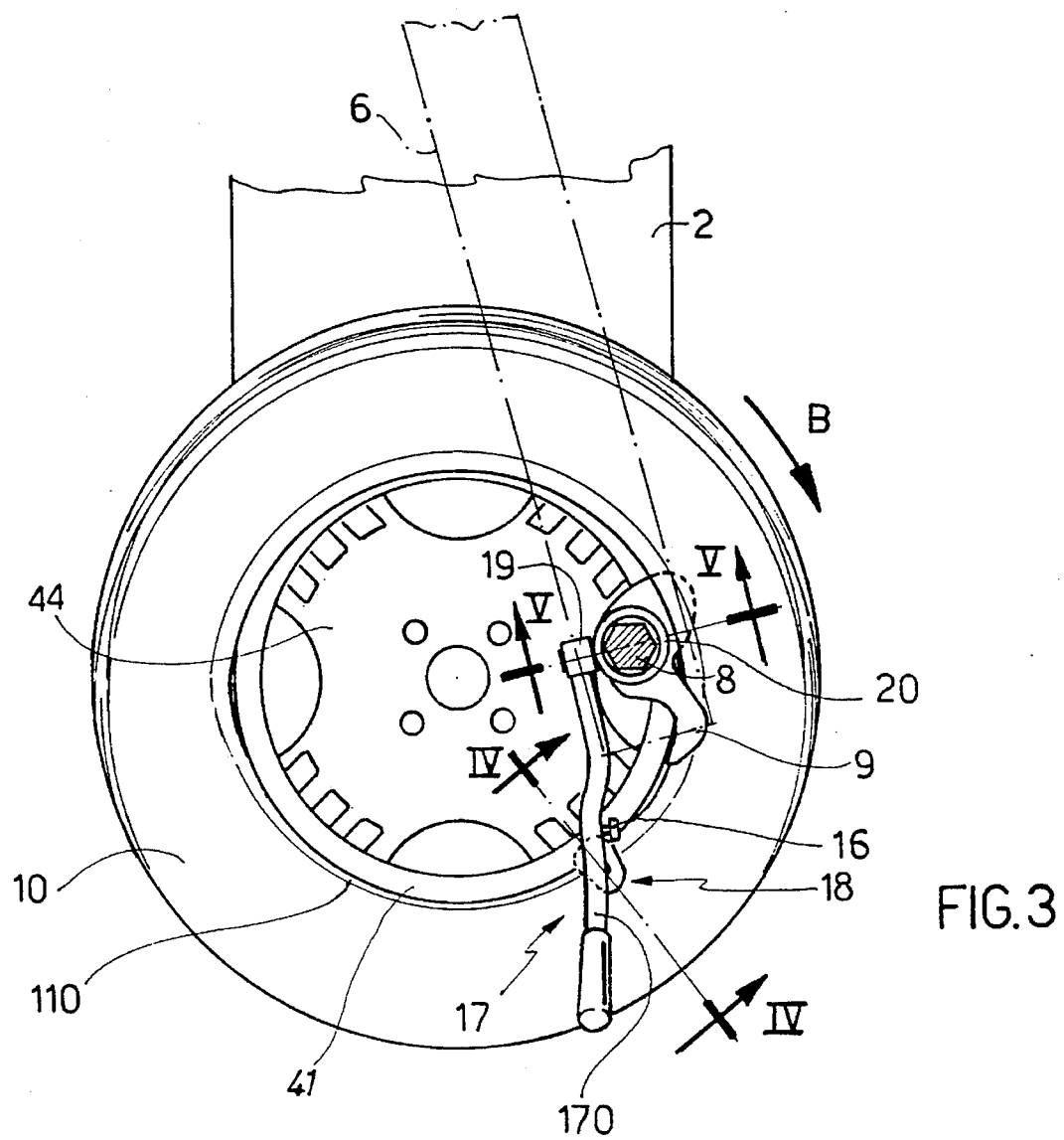
FIG. 3 is an enlarged section view on the line III—III of FIG 1 the invention being shown in its working position.

With reference to FIGS. 2, 3 and 4, for its connection to said member 15 the implement 17 comprises a peg 16 with an enlarged end which in combination with the slot 150 effects a type of bayonet engagement.

As can be seen in FIGS. 1, 3, 4 and 6, the implement 17 of the invention basically comprises a shaped arm 170 which is connected at one end to the rod 8, and at its other end supports a projecting profiled head 18.

Specifically, said connection (see FIG. 5) is made by a transverse bush 19 pivoted by a radial projecting pin 119 to a ring 20 mounted rotatable and slidable on the rod 8.

Figure 7:
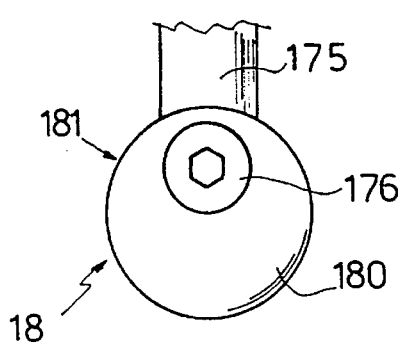
FIG. 7 is a front view of the bead guide head.
Figure 8:
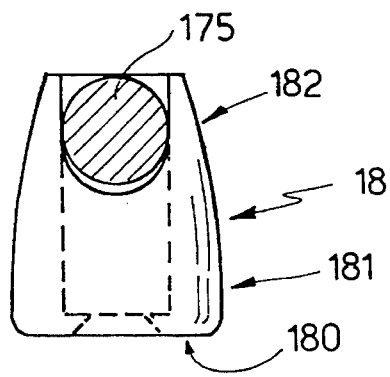
FIG. 8 is a view of the preceding figure from above.

The head 18 consists of a profiled body, for example of nylon or teflon, the free end of which consists of a cylindrical portion 181 having as its base a flat circular face (FIG.7) which connects smoothly to a rearward surface 182 substantially shaped as a portion of a spherical surface.

The head 18 is fixed by a screw 176 to a right appendix branching from the arm 170.

Finally, the dimensions of the head 18 are such as to prevent the appendix 175 from interfering with the wheel rim edge 41 when the head is hooked below this latter (see FIG. 6) and rests against the seat which receives the bead.

To insert the bead 110 of a tire 10 below the upper edge 41 of a wheel rim 44 locked onto the self-centering unit 4 (see FIGS. 4 and 6), and into the channel 43 of said wheel rim, the operations listed in the introduction are carried out with the exception of the operation for maintaining said bead 110 within said channel, which is now done by the head 18.

Specifically, when the bead 110 to be mounted has been positioned below said tool 9 (lowered, see FIGS. 3, 4) and in that part of the channel 43 situated downstream (with respect to the direction of rotation B of the self-centering unit 4) of the tool 9, the implement of the invention is released from the arm 6 and brought into its working position shown in FIGS. 3, 4 and 6.

Figure 6:
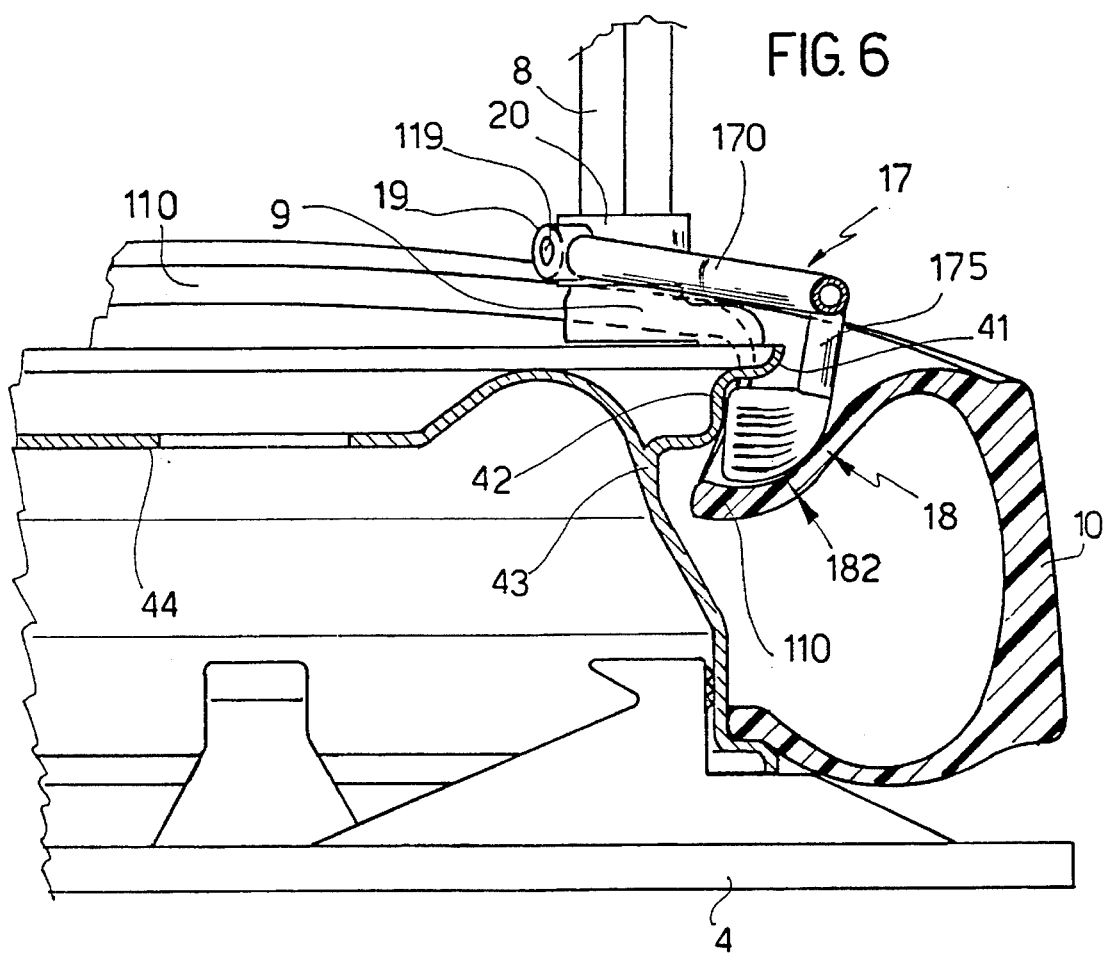

With particular reference to FIGS. 3 and 6, it should be noted that the implement of the invention is shaped and dimensioned such that when in said working position:

the arm 170 is substantially horizontal, as is the axis of the cylindrical portion 181 of the head 18, this axis being directed substantially towards the centre of the wheel rim 44, the front flat base 180 of the head 18 is in contact with the seat 42 receiving the bead, the top of the cylindrical surface 181 is in contact with the wheel rim edge 41, and the bottom of the cylindrical surface 181 plus the surface 182 press against the bead 110.

The freedom of movement of the arm 170 means that the implement 17 automatically adapts to wheel rims of different diameter.

I claim:

1. A tire mounting machine comprising:

a base frame;

a generally horizontal self centering unit mounted there on a generally vertical column located on said base frame at a distance from an axis of said horizontal self centering unit;

a generally horizontal arm supported by said generally vertical column, said generally horizontal arm having a free end which protrudes over said self centering unit;

a prismatic generally vertical rod slidingly mounted at said free end of said generally horizontal arm;

a tire mounting tool fixed at a lower end of said rod; and a shaped arm pivotally connected at one end to a ring which is rotatably and slidably mounted on said prismatic vertical rod, said shaped arm supports a projecting profiled head at a second end, said shaped arm being able to occupy a raised rest position and a lowered working position in which said projecting profiled head can be inserted between an edge of a wheel rim locked by the self centering unit and a bead of a tire to be mounted, and to rest against a seat of a wheel which receives the bead.

2. The tire mounting machine as claimed in claim 1, wherein the ring which is mounted on said rod in a manner free to slide and rotate, is provided with a projecting radial pin on which said shaped arm is pivoted.

3. The tire mounting machine as claimed in claim 1, wherein said projecting profiled head consists of a profiled body comprising:

a cylindrical surface of horizontal axis a flat base of which is arranged to rest against a wheel rim portion forming the seat for receiving the bead, and a rearward surface which connects smoothly to said cylindrical surface and is substantially shaped as a spherical surface portion on which the bead to be inserted into the wheel rim channel is deviated.

4. The tire mounting machine as claimed in claim 3, wherein said shaped arm and said head are dimensioned and shaped such that when the shaped arm is in said lowered working position the head is downstream of the tire mounting tool, with the axis of the cylindrical surface directed substantially towards the centre of the wheel rim.

5. The tire mounting machine as claimed in claim 1, wherein the shaped arm is provided with a lateral coupling member arranged to engage in a seat positioned on said horizontal arm in order to retain the shaped arm in said raised rest position.

\* \* \* \* \*

UNITED STATES PATENT AND TRADEMARK OFFICE
CERTIFICATE OF CORRECTION

PATENT NO. : 5,472,034
DATED : December 5, 1995
INVENTOR(S) : Remo CORGHI It is certified that error appears in the above-identified patent and that said Letters Patent is hereby corrected as shown below:

On the Title Page, under the Heading, [30] Foreign Application Priority Data, change "Mar. 18, 1993 [IT]   Italy .................. RE93U0020" to
-- Mar. 18, 1993 [IT]   Italy .................. RE93U000020--

Signed and Sealed this

Twelfth Day of March, 1996

*Attest:*

BRUCE LEHMAN

*Attesting Officer*    *Commissioner of Patents and Trademarks*